United States Patent [19]

Hightower

[11] 4,266,818
[45] May 12, 1981

[54] SAFETY BUMPER FOR TRUCKS

[75] Inventor: John H. Hightower, Thomasville, N.C.

[73] Assignee: Tommy Lee Holmes, Thomasville, N.C.

[21] Appl. No.: 18,851

[22] Filed: Mar. 8, 1979

[51] Int. Cl.³ ............................................. B60R 19/00
[52] U.S. Cl. ................................... 293/150; 188/1 C
[58] Field of Search ............... 293/149, 150, 154, 151, 293/152, 153; 188/1 C

[56] References Cited

U.S. PATENT DOCUMENTS 3,884,517  5/1975  Davidson ............................. 293/150

*Primary Examiner*—John J. Love
*Assistant Examiner*—John A. Carroll

[57] ABSTRACT

A folding safety bumper has a body portion which spans the respective front portion of the vehicle approximately between the front tires, and an end extension pivotally mounted on each respective end of the body portion. The end members are mounted in telescoping arrangement such that the front surface of the extension overlaps and extends in behind the rear surface of the body portion. The extension is biased into engagement with the rear surface of the body portion in a first normal position sufficient to withstand normal bumps and mishaps, by means of a cooperating bracket and brace rod. The brace rod, which is normally secured between the bracket and pivoting end extension, disengages under a forceful impact so that the end extension becomes free swinging.

3 Claims, 5 Drawing Figures

SAFETY BUMPER FOR TRUCKS

BACKGROUND OF THE INVENTION

The present invention is directed to bumpers of the type used on trucks. Such bumpers which are of especially heavy construction are mounted on the front of the truck, extending thereacross, to protect the truck frame and body from damage on impact with another object. Additionally, the ends of the bumper extending across the front of the front wheels serve as guards against rocks and small objects picked up by the front wheels being thrown forwardly into oncoming traffic.

A problem has arisen on various occasions with disastrous results occurring when a truck collides with another object, bending the end of the bumper backwardly against the front tire. When this occurs the bumper snags or locks against the tire causing loss of steering control and turning what might have been only a minor mishap into a major accident. Two patents which have recognized and are directed to this problem include U.S. Pat. Nos. 3,596,963 and 3,843,180.

U.S. Pat. No. 3,596,963 to Phillips in directed to an elongated bumper extension of the type made of a frangible material which does not bend but breaks and falls away on impact. The patent to Alexander, U.S. Pat. No. 3,843,180 is directed to a pivotal bumper extension which is hinged to the main portion of the bumper such that it pivots forwardly or rearwardly on impact, then automatically springs back to a normal bumper position. There are other patents of this type, some of which return to a normal position after impact and others utilizing shear pins or the like which permit the bumper extension to fall away on impact.

However, these devices lend themselves to new problems and deficiencies. Firstly, the hinged extensions do not serve to provide protection as a bumper for the frame or truck body due to the spring pressure of the mechanism which absorbs little, if any, impact. Therefore, the brunt of the impact must be absorbed by the truck or the truck tire which can cause blowouts. Secondly, if the extensions are of the type which shear or otherwise break away, there is a need for replacement, perhaps frequently and expensively. Also, without any bumper at all in front of the tire the truck might climb upon and crush cars involved in the accident.

Thus it can be seen that while the use of bumper extensions of hinged or breakaway type is broadly old, there remains a need for a bumper extension which is sufficiently strong to act as a permanent bumper to protect the truck frame and body by absorbing impact; yet of a structure preventing the snagging of a wheel and consequent loss of steering control in cases where the impact is strong enough to bend the bumper back into the tire.

SUMMARY OF THE PRESENT INVENTION

The present invention is directed to a pivotal end extension for truck bumpers especially constructed and mounted to absorb greater impact before yielding. The end extension is normally biased into its fully extended first position by a bracket and brace. However, upon impact sufficient to bend the extension the brace disengages and the end extension swings freely. The extension does not break away from the main bumper, nor does it snap or spring back into an aligned portion. Rather, the extension swings freely at the pivot joint, remaining in substantially colinear relationship with the main bumper, until the driver had had a chance to bring the truck to a safe stop and manually re-engage bracket and brace.

Thus it can be seen that according to the present invention a bumper extension is provided which will absorb sufficient impact to provide protection for the truck frame and body, as would a stationary or fixedly mounted bumper. However, when there is impact of sufficient force to bend the bumper extension the brace is automatically disengaged and the extension will swing freely but will not snag or bite into the front tire.

Other objects and advantages of the present invention will become apparent as the following detailed description is studied in conjunction with the accompanying drawings of which:

DETAILED DESCRIPTION OF PREFERRED EMBODIMENT

Figure 1:
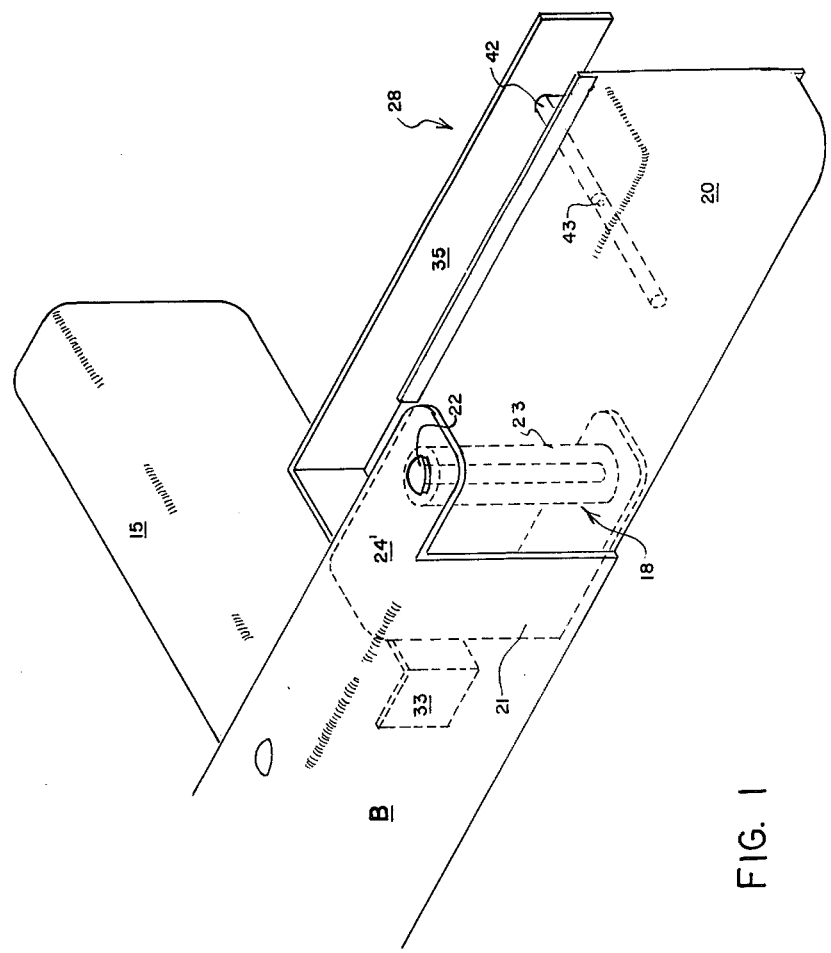
FIG. 1 is a front perspective view of the bumper mechanism as mounted on a large vehicle.

Turning now to FIG. 1 the bumper mechanism is shown to include a main body portion B and a pair of end extension members 20 connected on each end of body B by a pivotal mounting means 18. The body portion B may be constructed from the existing vehicle bumper by cutting off the end portions thereof and replacing with the extension members 20. Otherwise, the entire unit may be assembled to include body B and opposing ends 20 and then mounted on the vehicle frame extensions 15 such that the bumper span the front of the truck with the end extensions extending in front of the front tires.

Figure 4:
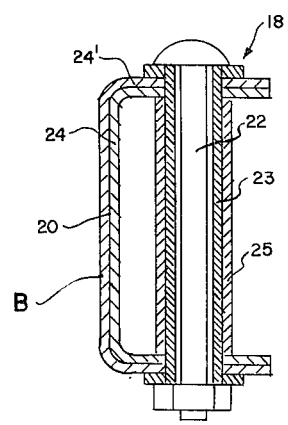
FIG. 4 is a vertical sectional view taken through the pivotal mounting means.

FIGS. 1 and 4 further illustrate the pivotal mounting means 18 for connecting the end extension 20 on the body portion B about a vertical axis, including a pivotal mounting bolt 22 extending down through openings in body portion B and extension 20 within sleeves 23 and 25. Inner sleeve 23 extends through or at least level with both the flanges of body member B and extension member 20 a little above and below the upper and lower surfaces of body member B. So arranged the bolt 22 and nut clamp down on sleeve 23 and not on the flanges themselves. Outer sleeve 25 surrounds inner sleeve 23 and extends between the inner surfaces of flanges 24 of extension 20 to provide a brace therebetween as well as improving the bearing relationship at the pivot point. As illustrated in FIG. 1 flanges 24 of extension 20 preferably include turned up or turned down edges to keep the edges from damaging the tire. This arrangement results in a stronger pivot joint capable of withstanding increased stress without binding. The extension member 20 includes a protruding section 21 which, when positioned overlaps and extends in behind the rear surface of the body portion B a considerable distance (at least two inches) past the pivot point where extension 20 is connected to the body portion B. While the invention is described as using the upper and lower flanges 24' for mounting the extension, it should be noted that many late model vehicles have bumpers which do not include upper and/or lower flanges. The flanges have no significant bearing on the utilization of the present invention with the exception of providing an easy mounting means, and the end extensions 20 will function equally well with or without the flanges 24,24'.

Figure 2:
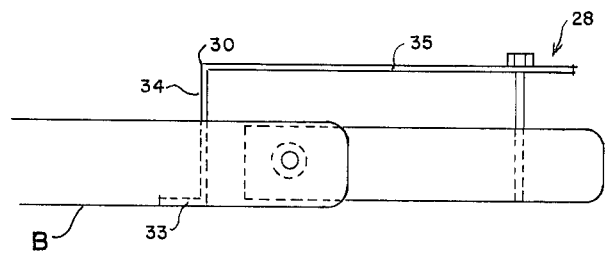
FIG. 2 is a detailed plan view of the mechanism of FIG. 1.

The end extensions 20 are connected to the body portion B on the rear surface thereof as shown in all drawings. This relationship between the two is essential to obtaining maximum strength and proper function of the biasing means 28. Biasing means 28 is more clearly illustrated in FIGS. 2 and 3 where it can be seen that a bracket 30 is basically a double-L shape extending rearwardly from body B. The description herein will be limited to only one end of the bumper but it should be understood that an end member 20 is attached to each side of body B and the construction is identical on each side.

Figure 3A:
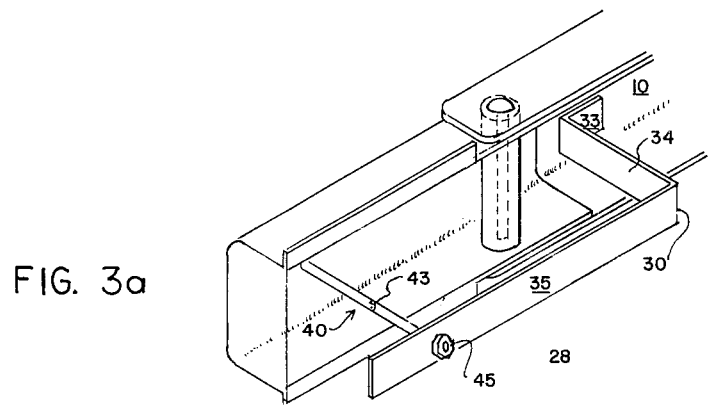
FIG. 3a is a rear perspective view showing details of the mounting and bracing mechanisms.
Figure 3B:
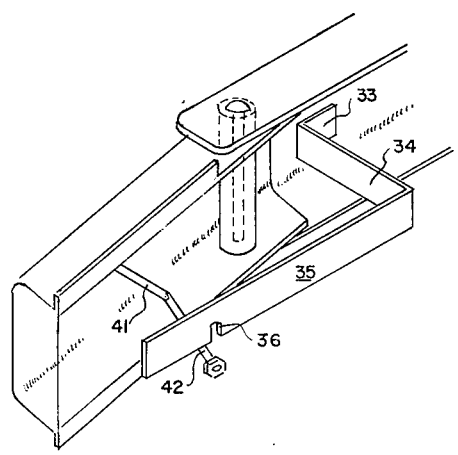
FIG. 3b is a view similar to FIG. 3a except showing the mechanism in a disengaged, free swinging position.

Returning now to FIGS. 2 and 3, one can see that the short arm 33 of the angle iron is secured by bolting, welding or other means to the rear surface 10 of body portion B. Connecting arm 34 extends perpendicularly rearwardly from the short arm 33 for a prescribed distance, at which point a long arm 35 extends outwardly therefrom in spaced, parallel relationship to the rearward surface of end extension 20. In FIG. 3 the long arm 35 is shown to include a vertically extending slot 36, open at its lower end.

In working relationship with bracket 30, the bracing rod 40 cooperates to bias the protruding section 21 of end extension member 20 forwardly tending to tie down end member 20 and prevent any swinging movement in the first normal position. Bracing rod 40 is segmented, having a first segment 41 welded or otherwise permanently secured to the rear surface of the end member 20. This first segment 41 is pivotally attached to a second segment 42 at pivot point 43. The pivot connection at point 43 will not be described in detail because it may be any of several known connections. In this instance it comprises a conventional horizontally extending pivot pin. The connection must be such as to permit the pivoting second segment 42 to drop or pivot downwardly when free as described below to release the end member 20 to a freely swinging condition on severe impacts. The bracing rod 40 is connected to bracket 30 by means of inserting the pivotal, threaded segment 42, in its upward position parallel to segment 41, through the slot 36 and tightening a threaded nut 45 thereon. It is obvious from an inspection of FIGS. 1-3b that as nut 45 is tightened onto the threaded pivotal segment 42, the segment 42 will be held in an upward position with end member 20 being restrained in an aligned position. The overlapping of protruding section 21 against the rear surface of bumper body portion B will provide sufficient rigidity of the entire bumper to withstand normal bumps and mishaps as would a permanent bumper. However, on severe impact, the end 20 will be bent backwardly at which time the nut 45 will be pushed away from the bracket face and the segment 42 will pivot downwardly out of slot 36. The end 20 will thus become free swinging.

At no time will the free swinging end extension 20 be bent into locked relationship with the tire because when the freely swinging extension strikes the tire it will immediately bounce forwardly away from the tire. However, should it be desired, a shield plate (not shown) may be secured across the rearward surface of extension 20 overlying any sharp edges which may cause damage to a tire.

After impact and recovery, it is a simple procedure to move the end extension 20 into alignment with body B, bias the pivot segment 42 into bracket 30, and the bumper is in condition for normal operation until the bent extension can be repaired or replaced.

Further modifications and changes will occur to those skilled in the art, likely falling within the scope of the invention as claimed below.

What is claimed is:

1. A safety bumper for use on a truck where said bumper extends across the body of the vehicle in confronting relationship with the front tires thereof, said safety bumper comprising:
   (a) a shortened main body portion spanning a distance no greater than the distance between the tires of the vehicle and having front and rear surfaces;
   (b) a pair of horizontally elongated end extension members having forward and rearward faces and a protruding section;
   (c) means for pivotally mounting one of said extension members to each end of said main body portion about a vertical axis, said pivotal mounting means being positioned at the end of said main body portion such that the rearward face of said main body portion overlaps said protruding section of said extension member and said extension member extends substantially across the front of the respective wheel of said vehicle;
   (d) bracing means for maintaining said extension member in a first normal position essentially in colinear relationship with said main body portion with said protruding section biased toward the rear surface of said main body portion;
   (e) said bracing means including disengagement means acting responsively to severe impact for disengaging said end extension from said first normal position and causing said extension member to assume a second free swinging position still in substantially colinear relationship with said main body portion.

2. A safety bumper as in claim 1 wherein said means for pivotally mounting said extension member includes upper and lower flanges depending rearwardly from the top and bottom edges of said main body portion and said extension member, correspondingly positioned apertures through said upper and lower flanges on said main body portion and said extension member, and a pivot pin positioned vertically through each of said apertures pivotally connecting said main body portion and said extension member.

3. A safety bumper as in claim 1 wherein said bracing means comprises:
   (a) bracket means including a first arm thereof secured to the rearward face of said bumper and a second arm extending in spaced parallel relationship along the rearward face of said end extension, said second arm including a slot extending vertically upward from the lower edge thereof with said slot being open at the lower end;
   (b) a bracing rod having first and second segments with said first segment being mounted perpendicularly to said rearward face of said end extension, and said second segment being pivotally mounted to the free end of said first segment;
   (c) said second segment being pivotal from a first, engaged position in colinear relationship with said first segment and the free end of said second segment extending through said slot in said bracket, to a second, disengaged position wherein said second segment pivots downwardly out of said slot, thereby disengaging said end extension from said first normal position to said second, free swinging position;

(d) means for releasably maintaining said second segment of said bracing rod in said slot.

* * * * *